United States Patent Office 3,660,350
Patented May 2, 1972

3,660,350
FLAME RETARDANT THERMOPLASTIC POLYMERS
Bernard G. Kushlefsky, Edison, N.J., assignor to M & T Chemicals Inc., Greenwich, Conn.
No Drawing. Filed May 7, 1971, Ser. No. 141,387
Int. Cl. C08f 45/56; C08g 51/56
U.S. Cl. 260—45.75 R   6 Claims

ABSTRACT OF THE DISCLOSURE

The drastic reduction in flame-retardant properties that occurs when polymer compositions containing organic phosphine oxides are processed at elevated temperatures is substantially eliminated when the phosphine oxides are present as complexes with selected Lewis acids.

BACKGROUND

A great variety of both organic and inorganic compounds are employed as flame retardants or flame-proofing agents for synthetic organic polymers. These materials are especially useful for incorporation into fibers prepared from these polymers. Phosphorus containing compounds, particularly organic phosphine oxide, are among the materials preferred for use as flame retardants in organic polymers. Compounds containing aromatic hydrocarbon radicals bonded to phosphorus exhibit excellent flame retarding properties; however, many of these compounds are unsuitable for incorporation into polymer compositions which are subsequently processed, e.g. shaped, milled, dried, cured, heat treated, etc. at temperatures that exceed about 200° C. At these temperatures the phosphorus compounds decompose and/or volatilizes to the extent that their effectiveness as flame retardants is either drastically reduced or lost for all practical purposes, necessitating the use of a large excess in the initial polymer composition.

One object of this invention is to provide novel flame retardant polymer compositions capable of being processed at elevated temperatures.

A second object of this invention is to provide flame retardants which are effective at flame temperatures but which do not lose their effectiveness when incorporated into polymers that are subsequently processed at temperatures between about 200–350° C.

SUMMARY OF THE INVENTION

The present invention concerns novel flame retardants comprising organic phosphine oxide-Lewis acid complexes represented by the formula

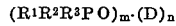
$(R^1R^2R^3PO)_m \cdot (D)_n$ wherein $R^1$, $R^2$, and $R^3$ represent identical or different aryl or alkaryl radicals; D represents a Lewis acid as hereinafter defined, with the proviso that the decomposition temperature of said complex is above about 200° C. and $m$ and $n$ represent integers selected from the group consisting of 1, 2, 3, and 4.

The present invention also concerns compositions comprising a thermoplastic saturated polyester and between 2.0 and 10% of at least one flame retardant exhibiting the formula

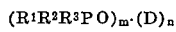
$(R^1R^2R^3PO)_m \cdot (D)_n$ defined hereinbefore.

DETAILED DESCRIPTION OF THE INVENTION

As used throughout this specification, the term "Lewis acid" refers to a compound that can accept a pair of electrons from at least one organic phosphine oxide molecule, thereby forming a thermally stable coordination complex, i.e. one which decomposes or volatilizes at flame temperatures; namely, temperatures between about 200 and 350° C., but not to any significant extent below these temperatures. One class of Lewis acids suitable for use in the organic phosphine oxide complexes of this invention includes compounds containing (1) a halogen-atom and (2) an element from the Group II–B or Group III–A of the Periodic Table. Representative compounds include boron trihalides, e.g. boron trifluoride, aluminum trihalide, e.g. aluminum chloride, halides of zinc, cadmium, and mercury. Other classes of suitable Lewis acids comprise halides of tin, antimony, bismuth, zirconium, cobalt, manganese, and molybdenum. Some of these compounds are colored, and would, therefore, be undesirable in some end use applications, e.g. textile fibers, where a colorless product is required.

Compounds other than halides, e.g. perchlorates, and nitrates are also useful Lewis acids. These compounds include zinc perchlorate, manganese perchlorate, cupric perchlorate, ferrous perchlorate, nickel(ous) perchlorate, cobalt(ous) nitrate, and zinc nitrate. Many of the aforementioned organo phosphine oxide-Lewis acid complexes are disclosed in the chemical literature, which reports the synthesis and physical properties of these complexes. However, the excellent flame retardant properties of these materials have heretofore not been recognized.

As disclosed in the accompanying examples, the triorganophosphine oxide complexes can conveniently be prepared from the appropriate aromatic phosphine oxide and Lewis acid. Preferably, each component is dissolved in a suitable solvent medium and the solutions are combined. It may be desirable to employ mixtures of two or more solvents for one or both of the reactants. Reaction between the phosphine oxide and Lewis acid is relatively rapid and often exothermic, so that in many instances no additional heating is required. Preferably the same solvent or two miscible solvents should be used, and the solvent or solvents selected such that the resultant complexes are insoluble in the reaction mixture. In this instance the complex can readily be isolated by filtration. Otherwise, it would be necessary to either add a non-solvent for the complex or remove sufficient solvent to insolubilize the material. Precipitation of the product may be accelerated by cooling the reaction mixture.

Alternatively, one can employ a heterogeneous reaction mixture in which one of the reactants, usually the phosphine oxide is insoluble. The accompanying examples describe the preparation of some preferred complexes.

Although triphenyl phosphine oxide together with other triaryl and trialkaryl phosphine oxides, i.e. tolyl phosphine oxide, impart excellent flame retardant properties, these compounds are sufficiently volatile and/or unstable that a major portion is destroyed when the polymer compositions are maintained at temperatures above 100° C. for any length of time. Many thermoplastic polymers, e.g. polyesters, polyolefins, are melted prior to and or during shaping, for example, into textile fibers. In many instances, the shaped articles are no longer flame retardant to any significant extent. The loss is greatest with articles exhibiting a large surface area, e.g. fibers. Surprisingly, a substantially complete retention of flame retardant properties in the shaped article is obtained when the phosphine oxide is complexed with the Lewis acids of this invention, even though the melting point of both the complex and free phosphine oxide may be substantially below the temperatures employed during shaping of the polymer. The organic phosphine oxide-Lewis acid complexes of this invention impart excellent flame retardant properties to a large variety of thermoplastic polymers including polyolefins, e.g. polyethylene, vinyl polymers, e.g. polyvinyl chloride, saturated polyesters, e.g. polyethylene terephthalate, and acrylic polymers, e.g. polyacrylontrile. In addition to the flame retardants of this invention, the polymer compositions may contain various additives and processing aids including plasticizers, lubricants, pigments, stabilizers, etc.

The preparation of some preferred aromatic phosphine oxide-Lewis acid complexes and the improved thermal stability and flame retardancy of these compounds relative to the free phosphine oxide is demonstrated in the following examples, which should not be interpreted as limiting the scope of this invention.

EXAMPLE 1

Preparation of a triphenyl phosphine oxide (TPPO)—stannous chloride complex

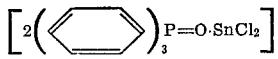

A solution prepared by dissolving 137.3 g. (0.5 mole) of triphenyl phosphine oxide in 150 cc. methanol was combined with a solution containing 47.4 g. (0.25 mole) stannous chloride and 150 cc. ethanol. The resultant clear solution was cooled in a refrigerator overnight, during which time a white solid precipitated. The solid was washed once with diethyl ether, after which it was dried under ambient conditions to yield 159 g. of product (86% yield). The solid exhibited the following analysis:

Calculated (percent): tin, 16.08; chloroine, 9.60; phosphorus, 8.39. Found (percent): tin, 16.47; chlorine, 8.97; phosphorus, 8.29; and melted between 128.5 and 129.5° C.

EXAMPLE 2

Preparation of triphenyl phosphine oxide-zinc chloride complex

A soultion containing 136.3 g. (1.0 mole) of zinc chloride dissolved in 350 cc. of acetone was added gradually to a stirred solution containing 556.5 g. (2.0 moles) of triphenyl phosphine oxide and 600 cc. of methanol. A white solid precipitated during the addition and the temperature of the resultant mixture increased by 15° C. The mixture was allowed to remain undisturbed at ambient temperature overnight, following which the solid was isolated by filtration, washed using 100 cc. of acetone, and dried under ambient conditions to yield 650 g. (94% yield) of a white solid exhibiting a melting range of 229.5–232° C. and the following analysis (calculated for $C_{36}H_{30}Cl_2O_2P_2Zn$):

Calculated (percent): phosphorus, 8.94; zinc, 9.44; chlorine, 10.25. Found (percent): phosphorus 8.85; zinc, 9.45; chlorine, 10.25.

EXAMPLE 3

Preparation of triphenyl phosphine oxide-boron-trifluoride complex

A reaction flask equipped with a stirrer, thermometer, reflux condenser, and nitrogen inlet was charged with 1392 g. (5 moles) triphenyl phosphine oxide, 6.25 liters of anhydrous diethyl ether and 625 cc. (5 moles) of a 1:1 molar ratio boron trifluoride: diethyl ether complex. The reagents were added in the order listed. The resultant white slurry was heated at reflux temperature with stirring for about three hours, during which time no change in the appearance of the reaction mixture was observed. After cooling to ambient temperature the mixture was filtered and the solid material washed with one 500 cc. portion of diethyl ether. The resultant white solid was allowed to dry under ambient conditions, yielding 1718 g. (99.3% yield). The melting range of the material was 237.6–238° C.

Several additional triphenyl phosphine oxide-TPPO-Lewis acid (MX) complexes were prepared using procedures similar to those described in Examples 1 and 2. Table I summarizes the solvents used together with the melting points and the analytical data for the complexes.

TABLE I

| Complex $[TPPO]_nMX$ | Solvent | | M.P., °C. | Analysis, percent | | | | | |
|---|---|---|---|---|---|---|---|---|---|
| | | | | Calculated | | | Found | | |
| | TPPO | MX | | P | M | X | P | M | X |
| $[TPPO]_2 \cdot SnCl_4$ | Toluene | Carbon tetrachloride | 300 | 7.58 | 14.53 | 17.36 | 6.90 | 14.93 | 17.01 |
| $[TPPO]_3 SbBr_3$ | do | Isopropyl alcohol | 136–144 | 7.77 | 10.18 | 20.04 | 7.24 | 10.00 | 19.25 |
| $[TPPO]_2 \cdot Zn(NO_3)_2$ | Methanol | Methanol | 236.5–241.5 | 8.30 | 8.77 | -------- | 8.26 | 8.67 | ----- |
| $[TPPO]_4 \cdot Zn(ClO_4)_2$ | do | do | 330 | 8.99 | 4.75 | 5.15 | 8.98 | 4.94 | 5.14 |
| $[TPPO]_2 \cdot TiCl_4$ | Isopropanol | None | 354–464 | 8.30 | 6.42 | 19.00 | 8.21 | 6.07 | 18.76 |
| $[TPPO] \cdot BF_3$ | Diethyl ether | Diethyl ether | 237–38 | 8.95 | 3.13 | 16.4 | 9.10 | 3.12 | 14.1 |

EVALUATING TPPO-LEWIS ACID COMPLEXES AS FLAME RETARDANTS

(A) Sample preparation

Under a nitrogen atmosphere a 47.5 g. sample of commercial poly(ethylene terephthalate) containing titanium dioxide as a delustering agent was combined with 2.5 g. of a given flame retardant candidate. The mixture was heated to between 280 and 290° C. to obtain a homogeneous melt. The molten material was then poured onto a cold metal plate and pressed to yield a 0.125 inch-thick sample which was cut to a convenient size for the subsequent flammability test.

(B) Flammability test

The samples prepared using the foregoing procedure were placed in the blue cone portion of the flame generated by a Bunsen burner. The exposure period ranged between 10–15 seconds. The test results were as follows:

| Sample | Flammability characteristics |
|---|---|
| Poly(ethylene terephthalate) (PET) | Burned for 10 seconds after removal of flame. |
| PET plus 5% triphenylphosphine oxide (TPPO). | Self-extinguishing following removal from flame. |
| PET plus 5% $(TPPO)_2 \cdot SnCl_2$ | Non-burning. |
| PET plus 5% $(TPPO)_2 \cdot ZnCl_2$ | Do. |
| PET plus 5% $(TPPO)_2 \cdot SbBr_3$ | Do. |
| PET plus 5% $(TPPO)_3 \cdot ZrCl_4$ | Self-extinguishing following removal from flame. |
| PET plus 5% $(TPPO)_2 \cdot SnCl_4$ | Non-burning. |
| PET plus 5% $(TPPO)_4 \cdot Zn(ClO_4)_2$ | Do. |
| PET plus 5% $(TPPO)_2 \cdot Zn(NO_3)_2$ | Do. |
| PET plus 5% $TPPO \cdot BF_3$ | Do. |

The test results indicate that both triphenylphosphine oxide and the Lewis acid complexes impart short term flame retardant properties to poly(ethylene terephthalate). The superiority of the Lewis acid complexes becomes apparent following long term exposure of the sample to elevated temperatures. This is demonstrated by the data in the following table. The samples were taken from the same material employed for the short-term test, and were exposed to the blue done of a Bunsen burner flame for 20 second intervals.

| Sample | Repeated flame exposure | | | | | |
|---|---|---|---|---|---|---|
| | 20 sec. | 20 sec. | 20 sec. | 20 sec. | 20 sec. | 20 sec. |
| PET control | Burned | | | | | |
| PET plus 5% TPPO | Self-extinguishing | Self-extinguishing | Self-extinguishing | Burned | | |
| PET plus 5% $TPPO \cdot BF_3$ | Self-extinguishing | Self-extinguishing | Self-extinguishing | Self-extinguishing | Self-extinguishing | Self-extinguishing₁ |

This invention is not limited to the compositions and prepararative methods disclosed herein, which represent preferred embodiments of the invention. The invention is defined in the appended claims.

What is claimed is:

1. A flame-retardant composition comprising a thermoplastic synthetic resin and between 2 and 10% by weight of coordination complex of an aromatic phosphine oxide with a Lewis acid represented by the formula $$(R^1R^2R^3PO)_m(D)_n$$

wherein $R^1$, $R^2$ and $R^3$ represent identical or different aryl or alkaryl radicals, $m$ and $n$ are integers of from 1 to 4 and D represents an inorganic Lewis acid wherein the cation portion is an element selected from the group consisting of tin, bismuth, antimony, zirconium, cobalt, manganese, titanium, molybdenum and Group II–B or III–A of the Periodic Table, with the proviso that the decomposition temperature of said complex is above 200° C.

2. The flame retardant composition of claim 1 wherein the aromatic phosphine oxide is triphenyl phosphine oxide.

3. The flame retardant composition of claim 1 wherein said inorganic compounds are halogen-containing acids.

4. The flame retardant composition of claim 1 wherein the Lewis acid is selected from the group consisting of antimonous chloride, boron trifluoride, stannous chloride, stannic chloride, titanium tetrachloride, zinc chloride, zinc nitrate and zinc perchlorate.

5. The composition of claim 1 wherein the thermoplastic resin is a saturated polyester.

6. The composition of claim 5 wherein said polyester is poly(ethylene terephthalate).

References Cited

UNITED STATES PATENTS

| | | | |
|---|---|---|---|
| 3,269,963 | 8/1966 | Ilgemann et al. | 260—45.7 |
| 3,341,625 | 9/1967 | Gillham et al. | 260—45.7 |
| 3,284,543 | 11/1966 | Gillham et al. | 260—45.7 |
| 3,345,392 | 10/1967 | Grayson et al. | 260—45.7 |
| 3,468,678 | 9/1969 | Clampitt et al. | 260—45.7 |
| 3,594,346 | 7/1971 | Hermann et al. | 260—45.7 |

DONALD E. CZAJA, Primary Examiner

V. P. HOKE, Primary Examiner

U.S. Cl. X.R.

252—8.1; 260—45.7 P, 45.75 N, 45.75 K